(12) United States Patent
Weaver et al.

(10) Patent No.: US 12,485,630 B2
(45) Date of Patent: Dec. 2, 2025

(54) FORMING A PREFORM INTO A SHAPED BODY

(71) Applicant: ROHR, INC., Chula Vista, CA (US)

(72) Inventors: Luby R. Weaver, Redlands, CA (US); Katherine E. Waugh, Coronado, CA (US); Christopher C. Koroly, Spring Valley, CA (US); Anthony H. Becher, Hesperia, CA (US); Vijay V. Pujar, San Diego, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 139 days.

(21) Appl. No.: 18/484,296

(22) Filed: Oct. 10, 2023

(65) Prior Publication Data

US 2024/0059035 A1 Feb. 22, 2024

Related U.S. Application Data

(62) Division of application No. 17/889,283, filed on Aug. 16, 2022, now Pat. No. 11,813,812.

(51) Int. Cl.
| | |
|---|---|
| *B29C 70/56* | (2006.01) |
| *B28B 3/00* | (2006.01) |
| *B28B 7/00* | (2006.01) |
| *B28B 17/00* | (2006.01) |
| *B29C 70/54* | (2006.01) |
| *C04B 35/83* | (2006.01) |

(52) U.S. Cl.
CPC ............... *B29C 70/56* (2013.01); *B28B 3/00* (2013.01); *B28B 7/0029* (2013.01); (Continued)

(58) Field of Classification Search
CPC .................. B29C 70/56; B29C 70/541; B29C 53/04–066; B29C 67/0011;
(Continued)

(56) References Cited

U.S. PATENT DOCUMENTS

| | | | |
|---|---|---|---|
| 5,026,514 | A | 6/1991 | Hauwiller et al. |
| 6,723,272 | B2 | 4/2004 | Montague et al. |

(Continued)

FOREIGN PATENT DOCUMENTS

| | | |
|---|---|---|
| DE | 102012010497 | 12/2012 |
| DE | 102013008697 | 3/2014 |
| WO | 2021118069 | 6/2021 |

OTHER PUBLICATIONS

European Patent Office, European Search Report dated Jan. 22, 2024 in Application No. 23189600.2.
(Continued)

*Primary Examiner* — Susan D Leong
*Assistant Examiner* — Vipul Malik
(74) *Attorney, Agent, or Firm* — SNELL & WILMER L.L.P.

(57) ABSTRACT

A manufacturing method is disclosed herein. The method includes arranging a preform with a plurality of clamping assemblies, the plurality of clamping assemblies disposed along ends of the preform; and forming the preform into a shaped body, the forming including incrementally tensioning the preform around a surface of an inner mold line using the plurality of clamping assemblies; and drawing the preform into a set of forming beads of the inner mold line.

8 Claims, 10 Drawing Sheets

(52) U.S. Cl.
CPC ........ *B28B 17/0009* (2013.01); *B29C 70/541* (2013.01); *C04B 35/83* (2013.01); *C04B 2235/5252* (2013.01)

(58) Field of Classification Search
CPC ..... B28B 17/0009; C04B 35/83; B21D 11/02; B21D 25/02
See application file for complete search history.

(56) References Cited

U.S. PATENT DOCUMENTS

| | | |
|---|---|---|
| 8,601,694 B2 | 12/2013 | Brennan et al. |
| 10,150,233 B2 | 12/2018 | Kline et al. |
| 2004/0148997 A1 | 8/2004 | Amino et al. |
| 2010/0263789 A1 | 10/2010 | Gräber |
| 2012/0263818 A1* | 10/2012 | Glain ................ B29C 70/56 425/403 |
| 2021/0101318 A1 | 4/2021 | Rodgers et al. |
| 2021/0187787 A1 | 6/2021 | Cebolla Garrofe |
| 2021/0339483 A1 | 11/2021 | Werntges et al. |
| 2022/0227078 A1* | 7/2022 | Wadsworth ........... B29C 70/541 |

OTHER PUBLICATIONS

USPTO; Non-Final Office Action dated Aug. 3, 2023 in U.S. Appl. No. 17/889,283.

USPTO; Requirement for Restriction dated Sep. 20, 2023 in U.S. Appl. No. 17/889,283.

USPTO; Notice of Allowance dated Sep. 13, 2023 in U.S. Appl. No. 17/889,283.

* cited by examiner

FORMING A PREFORM INTO A SHAPED BODY

CROSS REFERENCE TO RELATED APPLICATIONS

This application is a divisional of, and claims priority to and the benefit of, U.S. patent application Ser. No. 17/889,283, filed Aug. 16, 2022, entitled "FORMING A PREFORM INTO A SHAPED BODY," which is hereby incorporated by reference in its entirety for all purposes.

FIELD

The present disclosure relates generally to forming a preform into a shaped body.

BACKGROUND

Shaped composite bodies are utilized in aerospace applications. Various systems and methods are known in the art for forming a preform into a shaped body.

SUMMARY

According to various embodiments of the present disclosure, a manufacturing method is provided. The method includes arranging a preform with a plurality of clamping assemblies, the plurality of clamping assemblies disposed along ends of the preform; and forming the preform into a shaped body, the forming including incrementally tensioning the preform around a surface of an inner mold line using the plurality of clamping assemblies; and drawing the preform into a set of forming beads of the inner mold line.

In various embodiments, each clamping assembly in the plurality of clamping assemblies includes a male member comprising a protrusion and a female member comprising a receptacle. In various embodiments, the male member and the female member, when coupled together, apply a clamping force to an end of the preform. In various embodiments, each of the plurality of clamping assemblies comprise one or more metal loops that couples to at first plurality of strapping mechanisms. In various embodiments, incrementally tensioning the preform around the surface of the inner mold line includes: tensioning a first set of the first plurality of strapping mechanisms coupled to the plurality of clamping assemblies and to a first side of a table at a first location; and in response to the first set of the first plurality of strapping mechanisms reaching a maximum tension, tensioning a second set of the first plurality of strapping mechanisms coupled to the plurality of clamping assemblies and to the first side of the table at a second location while releasing a tension of the first set of the first plurality of strapping mechanisms.

In various embodiments, further sets of the first plurality of strapping mechanisms are used to tension the preform around the surface of the inner mold line until the preform relatively follows the near net shape of the inner mold line. In various embodiments, the method further includes applying a second plurality of strapping mechanisms coupled to the plurality of clamping assemblies and to a second side of the table; and incrementally draw in the preform to lower sides of the inner mold line. In various embodiments, drawing the preform into the set of forming beads of the inner mold line includes coupling a forming rod assembly to the inner mold line; and tightening the forming rod assembly into the set of forming beads while holding a tension via the plurality of clamping assemblies.

In various embodiments, the forming rod assembly includes: a first set of alignment brackets coupled to a front one of a plurality of IML stiffeners of the inner mold line; a second set of alignment brackets coupled to a back one of the plurality of IML stiffeners; a first threaded rod positioned through the first set of alignment brackets; a second threaded rod positioned through the second set of alignment brackets; a first forming rod coupled to a first end of the first threaded rod and a first end of the second threaded rod; a second forming rod coupled to a second end of the first threaded rod and a second end of the second threaded rod; a first nut coupled to the first end of the first threaded rod; a second nut coupled to the second end of the first threaded rod; a third nut coupled to the first end of the second threaded rod; and a fourth nut coupled to the second end of the second threaded rod.

In various embodiments, incrementally tensioning the preform around the surface of the inner mold line includes tensioning a first set of a first plurality of strapping mechanisms coupled to the plurality of clamping assemblies and to a carriage rail system while the carriage rail system translates toward the inner mold line until the preform relatively follows the near net shape of the inner mold line. In various embodiments, the method further includes applying a second plurality of strapping mechanisms coupled to the plurality of clamping assemblies and to an underside of a table; and incrementally draw in the preform to lower sides of the inner mold line.

Also disclose herein is a system for forming a preform into a shaped body. The system includes: an inner mold line; a first plurality of strapping mechanisms to incrementally tension the preform around a surface of the inner mold line using a plurality of clamping assemblies; and a forming rod assembly to draw the preform into a set of forming beads of the inner mold line. In various embodiments, each clamping assembly in the plurality of clamping assemblies includes a male member comprising a protrusion and a female member comprising a receptacle, and wherein the male member and the female member, when coupled together, apply a clamping force to an end of the preform. In various embodiments, each of the plurality of clamping assemblies comprise one or more metal loops that couples to the first plurality of strapping mechanisms.

In various embodiments, a first set of the first plurality of strapping mechanisms are coupled the plurality of clamping assemblies and to a first side of a table at a first location and wherein the system further includes: a second set of the first plurality of strapping mechanisms coupled to the plurality of clamping assemblies and to the first side of the table at a second location to incrementally tension the preform around the surface of the inner mold line using the plurality of clamping assemblies in response to the first set of the first plurality of strapping mechanisms reaching a maximum tension, wherein a tension of the first set of the first plurality of strapping mechanisms is released once a tension is provided by the second set of the first plurality of strapping mechanisms.

In various embodiments, the system further includes further sets of the first plurality of strapping mechanisms to tension the preform around the surface of the inner mold line until the preform relatively follows the near net shape of the inner mold line. In various embodiments, the system further includes a second plurality of strapping mechanisms coupled to the plurality of clamping assemblies and to a second side of the table to apply tension and incrementally draw in the preform to lower sides of the inner mold line. In various embodiments, the forming rod assembly is tightened into the set of forming beads while holding the tension via the plurality of clamping assemblies.

In various embodiments, the forming rod assembly includes: a first set of alignment brackets coupled to a front one of a plurality of IML stiffeners of the inner mold line; a second set of alignment brackets coupled to a back one of the plurality of IML stiffeners; a first threaded rod positioned through the first set of alignment brackets; a second threaded rod positioned through the second set of alignment brackets; a first forming rod coupled to a first end of the first threaded rod and a first end of the second threaded rod; a second forming rod coupled to a second end of the first threaded rod and a second end of the second threaded rod; a first nut coupled to the first end of the first threaded rod; a second nut coupled to the second end of the first threaded rod; a third nut coupled to the first end of the second threaded rod; and a fourth nut coupled to the second end of the second threaded rod.

In various embodiments, the system further includes a first set of the first plurality of strapping mechanisms coupled to the plurality of clamping assemblies and to a carriage rail system to incrementally tension the preform while the carriage rail system translates toward the inner mold line until the preform relatively follows the near net shape of the inner. In various embodiments, the system further includes a second plurality of strapping mechanisms coupled to the plurality of clamping assemblies and to a second side of a table to apply tension and incrementally draw in the preform to lower sides of the inner mold line.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

Figure 1:
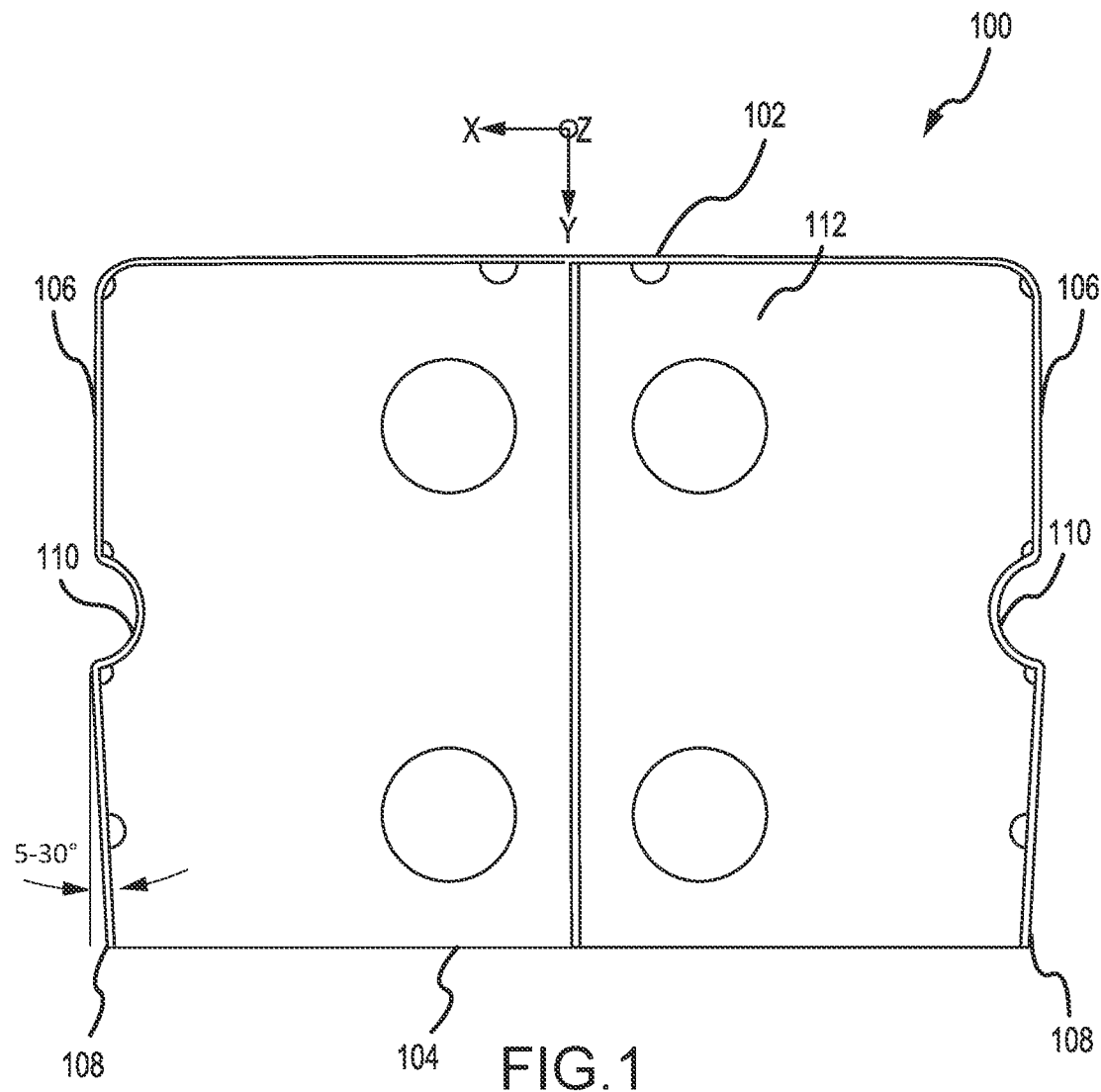
FIG. 1 illustrates an inner-mold line with tensioning and/or forming beads for use in forming a shaped body from a preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein are systems and methods for forming a preform into a shaped body. The systems and methods relate to complex geometry carbon preforms for C-C composites with curvatures along multiple planes. To properly form a shaped body, appropriate tension must be applied to the preform, such that the preform may be stretched around various corners and radii with little to no wrinkling or fiber kinking—important to achieve target mechanical properties and reproducibility. In various embodiments, the systems and methods disclosed herein, in various embodiments, utilize a male inner mold line (IML) tool with tensioning/forming beads in conjunction with clamping rods and strapping mechanisms to stretch-form the preform. The male IML tool is designed as a net shape or near net shape (NNS) representation of the final part geometry. The preform is laid atop the male IML tool with multiple clamping assemblies gripping onto either side wall. Strapping mechanisms are attached to the clamp assemblies and interface with tensioners/fasteners on a weld table, instrument table, or other support structure. The side walls of the preform may be incrementally formed around the tool surface until the side walls relatively follow the NNS IML. Rods that align with forming beads in the male IML tool may then be tightened to draw the material into a forming bead, which proportionally tensions and forms the material. An undercut tool surface allows the gripped edge of the material to be pulled at an angle, giving an improved mechanical advantage to form the material around complex radii. In various embodiments, the preforms may then be compressed by vacuum-bagging (i.e., negative pressure) or using vacuum bagging and autoclave pressure (i.e., positive pressure). In various embodiments, the positive pressure on the preforms may be alternatively applied using flexible caul plates and pressurized bladders or using an actuated platen press, among others, to apply uniform pressure and compaction.

The disclosed systems and methods for forming a preform into a shaped body is an improvement over the current matched-die tooling for shape-forming, in various embodiments, by reducing or eliminating undesired wrinkling and kinking during part forming. The disclosed improvements to tooling, in various embodiments, and forming addresses the wrinkling and uneven compression issues seen in the match-die tooling approach. The clamping rods and strapping mechanisms provide for controlled tensioning and stretching to produce a fiber preform conforming to the complex shape and avoiding fiber wrinkling and kinking.

Referring now to FIG. 1, in accordance with various embodiments, an inner-mold line with tensioning and/or forming beads for use in forming a shaped body from a preform is illustrated. Inner-mold line (IML) 100 comprises a top section 102, a bottom section 104, upper side sections 106, lower side sections 108, and a plurality of IML stiffeners 112. A division is provided between the upper side sections 106 and the lower side sections 108 by concave forming beads 110. In various embodiments, the upper side sections 106 may be substantially vertical. In various embodiments, the upper side sections 106 may be substantially parallel to the y-axis. In various embodiments, the upper side sections 106 may be substantially perpendicular to the x-axis. In various embodiments, the angle of the lower side sections 108 may differ from the angle of the upper side sections 106. In that regard, the lower side sections 108 may be undercut by 2 to 10 degrees. In various embodiments, the lower side sections 108 may be undercut by 3 to 8 degrees. In various embodiments, the lower side sections 108 may be undercut by 4 to 6 degrees. The angle of the lower side sections 108 allows the gripped edge of the preform to be pulled at an angle, giving an improved mechanical advantage to form the material around complex radii. In various embodiments, the plurality of IML stiffeners 112 are provided throughout the inner surface of the IML 100 between the opposing upper side sections and opposing lower side sections 108 to strengthen the IML 100. In various embodiments, the IML 100 is aligned and bolted onto a table, such as a weld table, instrument table, or other support structure, among others.

Figure 2:
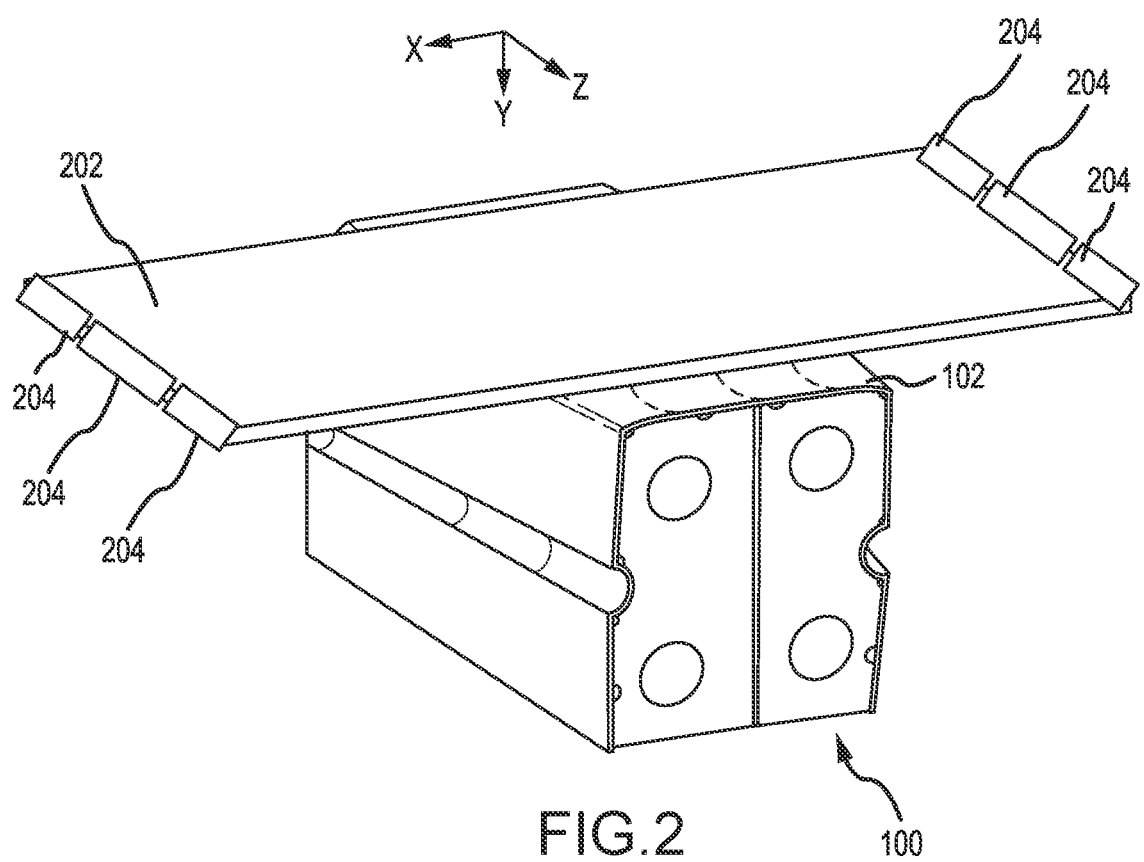
FIG. 2 illustrates a preparation operation for forming a preform into a shaped body, in accordance with various embodiments.

Turning to FIG. 2, in accordance with various embodiments, a preparation operation for forming a preform into a shaped body is illustrated. Initially, in various embodiments, a preform board 202 is laid onto the top section 102 of the IML 100 of FIG. 1. In various embodiments, the preform board 202 may be a multi-layered preform board manufactured from a fabric material, fibrous material, stitched material, or woven material, among others. In various embodiments, the preform board 202 may be manufactured from carbon fiber, polyacrylonitrile (PAN) fiber, or oxidized PAN fiber (OPF), among others, with nylon fiber or polyester fiber stitching in various embodiments and the inclusion of veil materials (carbon, OPF, glass, thermoplastic, etc.) in various embodiments. In various embodiments, the preform board 202 is configured in rectangular shape, square shape, polygon shape, or elliptical shape, among others. In various embodiments, one or more clamping assemblies 204 are attached to the ends of the preform board 202. In various embodiments, the one or more clamping assemblies 204 are attached to the entire length of the ends of the preform board 202. In various embodiments, the one or more clamping assemblies 204 are attached at select portions of the ends of the preform board 202.

Figure 3:
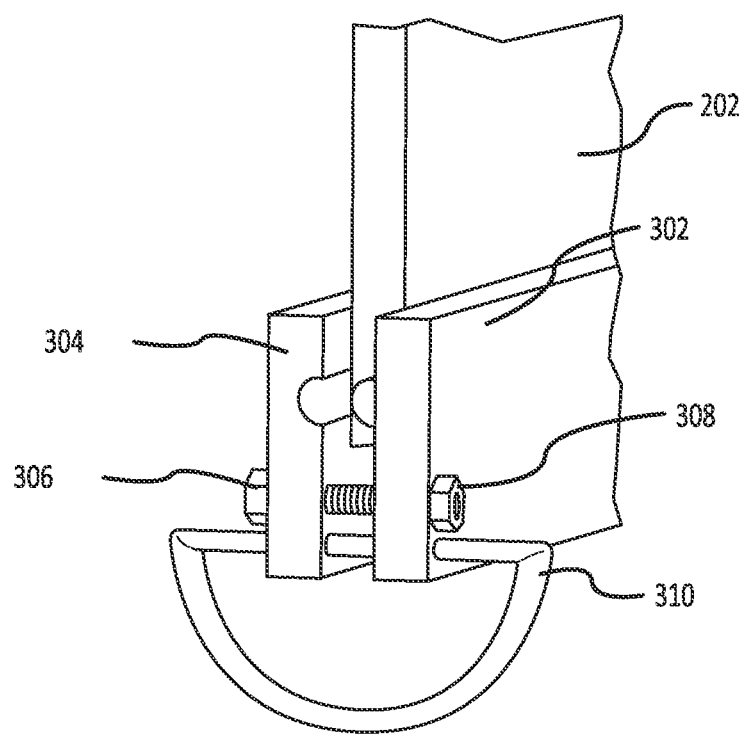
FIG. 3 illustrates a clamping assembly used in forming a preform into a shaped body, in accordance with various embodiments.

Turning to FIG. 3, in accordance with various embodiments, a clamping assembly used in forming a preform into a shaped body is illustrated. Clamping assembly 204 of FIG. 2 comprises a male member portion 302, a female member portion 304, bolt 306, nut 308, and one or more metal loops 310. In various embodiments, the bolt 306 may comprises a head and a cylindrical body with screw threads along a portion of its length. In various embodiments, the nut 308 may comprises internal threads to match those of the bolt 306 and have an external shape in the form of a hexagon, square, or triangle, among others. In various embodiments, the male member portion 302, having a protrusion, may be placed on a first side of the end of the preform board 202. In various embodiments, the female member portion 304, having a receptacle, may be placed on a second side opposite the first side of the preform board 202. In various embodiments, a plurality of bolt 306 may be inserted through holes in the male member portion 302 and the female member portion 304 such that, in response to a nut 308 being attached, each of the plurality of bolts 306 and the nuts are tightened and a clamping force is applied that secures the preform board 202 between the protrusion of the male member portion 302 and the receptacle of the female member portion 304. In various embodiments, the clamping force may be applied to the entire thickness of the preform board 202. In various embodiments, the clamping force may be applied to a portion of the thickness of the preform board 202. In various embodiments, the metal loops 310, which may be a D-ring or shackle, among others, may be configured so that a first portion of the metal loops 310 couples to the male member portion 302 and the female member portion 304. In various embodiments, the metal loops 310 may be configured such that a second portion of the metal loop is configured to be coupled to a strapping mechanism, such as a come-along strap, winch strap, or ratchet tie-down strap, among others.

Figure 4:
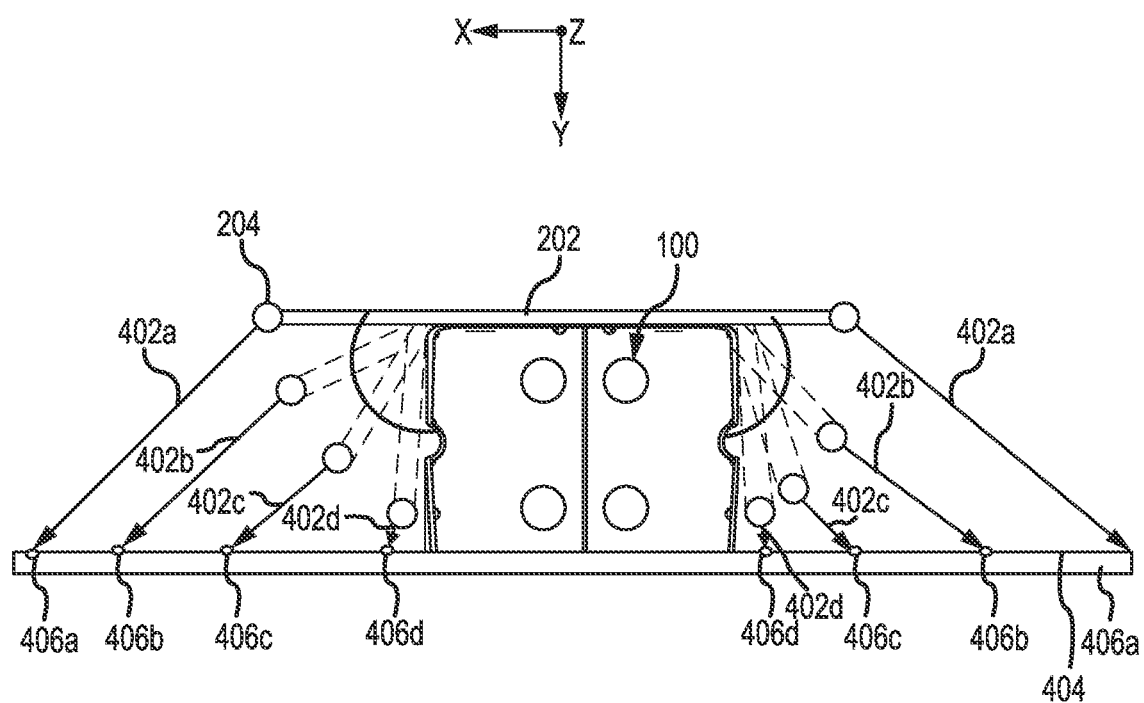
FIG. 4 illustrates a drawing operation for forming a preform into a shaped body, in accordance with various embodiments.

Turning to FIG. 4, in accordance with various embodiments, a drawing operation for forming a preform into a shaped body is illustrated. In various embodiments, a first end of a plurality of strapping mechanisms 402a-d are coupled to the metal loops 310 of the clamping assemblies 204 of FIG. 3. In various embodiments, a second end of each of the plurality of strapping mechanisms 402a-402d are coupled to respective attachment locations 406a-d on table 404. In various embodiments, various ones of the plurality of strapping mechanisms 402a-402d are incrementally tensioned such that the preform board is incrementally drawn in the preform board 202 to influence smooth forming around the radial corners of the IML 100. In that regard, starting with an outermost strapping mechanism 402a, the strapping mechanisms 402a are simultaneously or substantially simultaneously tensioned so as to incrementally draw in the preform board 202 to influence smooth forming around the radial corners of the IML 100. In various embodiments, once strapping mechanisms 402a have reached their desired tension, strapping mechanisms 402b are simultaneously or substantially simultaneously tensioned so as to further incrementally draw in the preform board 202 to influence smooth forming around the radial corners of the IML 100. It is noted that as strapping mechanisms 402b are simultaneously or substantially simultaneously tensioned, strapping mechanisms 402a are released as the tensioning of the preform board 202 has now been assumed by the strapping mechanisms 402b.

In various embodiments, once strapping mechanisms 402b have reached their desired tension, strapping mechanisms 402c are simultaneously or substantially simultaneously tensioned so as to further incrementally draw in the preform board 202 to influence smooth forming around the radial corners of the IML 100. It is noted that as strapping mechanisms 402c are simultaneously or substantially simultaneously tensioned, strapping mechanisms 402b are released as the tensioning of the preform board 202 has now been assumed by the strapping mechanisms 402c. In various embodiments, once strapping mechanisms 402c have reached their maximum tension, strapping mechanisms 402d are simultaneously or substantially simultaneously tensioned so as to further incrementally draw in the preform board 202 to influence smooth forming around the radial corners of the IML 100. It is noted that as strapping mechanisms 402d are simultaneously or substantially simultaneously tensioned, strapping mechanisms 402c are released as the tensioning of the preform board 202 has now been assumed by the strapping mechanisms 402d. In various embodiments, the strapping mechanisms 402d are tensioned until the preform board 202 relatively follows the near net shape of the inner mold line.

Figure 5:
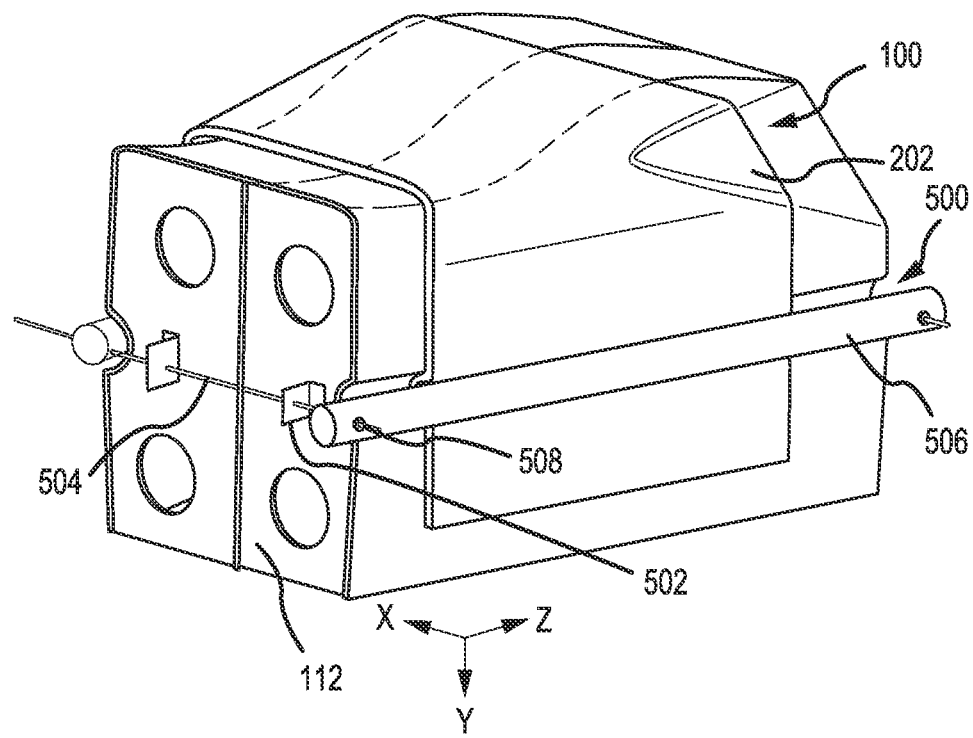
FIG. 5 illustrates an operation for attaching a forming rod assembly to the IML 100 to complete a next stage of the forming of the preform into a shaped body, in accordance with various embodiments.

Turning to FIG. 5, in accordance with various embodiments, an operation for attaching a forming rod assembly to the IML 100 to complete a next stage of the forming of the preform into a shaped body is illustrated. In various embodiments, once strapping mechanisms 402d of FIG. 4 have reached their maximum tension and the preform board 202 is nearing the side of IML 100, a forming rod assembly 500 may be aligned with the IML 100 to draw the preform board 202 fully into the forming beads 110 of FIG. 1. In various embodiments, the forming rod assembly 500 comprises alignment brackets 502, threaded rods 504, forming rods 506, and nuts 508. In various embodiments, a first set of the alignment brackets 502 are coupled to the front one of the plurality of IML stiffeners 112 and a second set of the alignment brackets are coupled to a back one of the plurality of IML stiffeners of FIG. 1, with at least two alignment brackets 502 on each of the front and the back ones of the IML stiffeners 112. In various embodiments, alignment brackets 502 are corner shaped or L-shaped brackets with one or more openings in each of the flat surfaces of the alignment brackets 502. In various embodiments, a first set of the alignment brackets 502 are coupled to the front one of the plurality of IML stiffeners 112 and a second set of the alignment brackets are coupled to a back one of the plurality of IML stiffeners using, for example, bolts and nuts or self-tapping screws, among others, that utilize a first opening on a first surface of the alignment brackets 502. In various embodiments, a first threaded rod 504 is positioned through a second opening of a second surface of the alignment brackets 502 on the front surface of the IML 100 and a second threaded rod is positioned through a second opening of a second surface of the alignment brackets 502 on the back surface of the IML 100. In various embodiments, the threaded rods 504 are of a sufficient length to extend beyond the sides of the IML 100.

In various embodiments, a first forming rod 506 is coupled to a first end of the threaded rods 504 on a first side of the IML 100 and a second forming rod 506 is coupled to a second end of the threaded rods 504 on a second side of the IML 100. In various embodiments, the first and second forming rods 506 may be coupled to the threaded rods 504 utilizing openings near an end of the forming rods 506. In various embodiments, the openings may be within 0.5-5 inches (1.27-12.7 centimeters) of the ends of the forming rods 506. In various embodiments, the openings may be within 1-4 inches (2.54-10.16 centimeters) of the ends of the forming rods 506. In various embodiments, the openings may be within 2-3 inches (5.08-7.62 centimeters) of the ends of the forming rods 506. In various embodiments, once the forming rods 506 have been coupled to the threaded rods 504, the nuts 508, which may be similar to nut 308 of FIG. 3, may be coupled to each end of the threaded rods 504. In various embodiments, once the nuts 508 are coupled to each end of the threaded rods 504, the nuts 508 may be simultaneously or substantially simultaneously tightened onto the threaded rods 504 running between the forming rods 506 to slowly force or pull the preform board 202 all the way to the tool body and into the forming beads 110.

Figure 6:
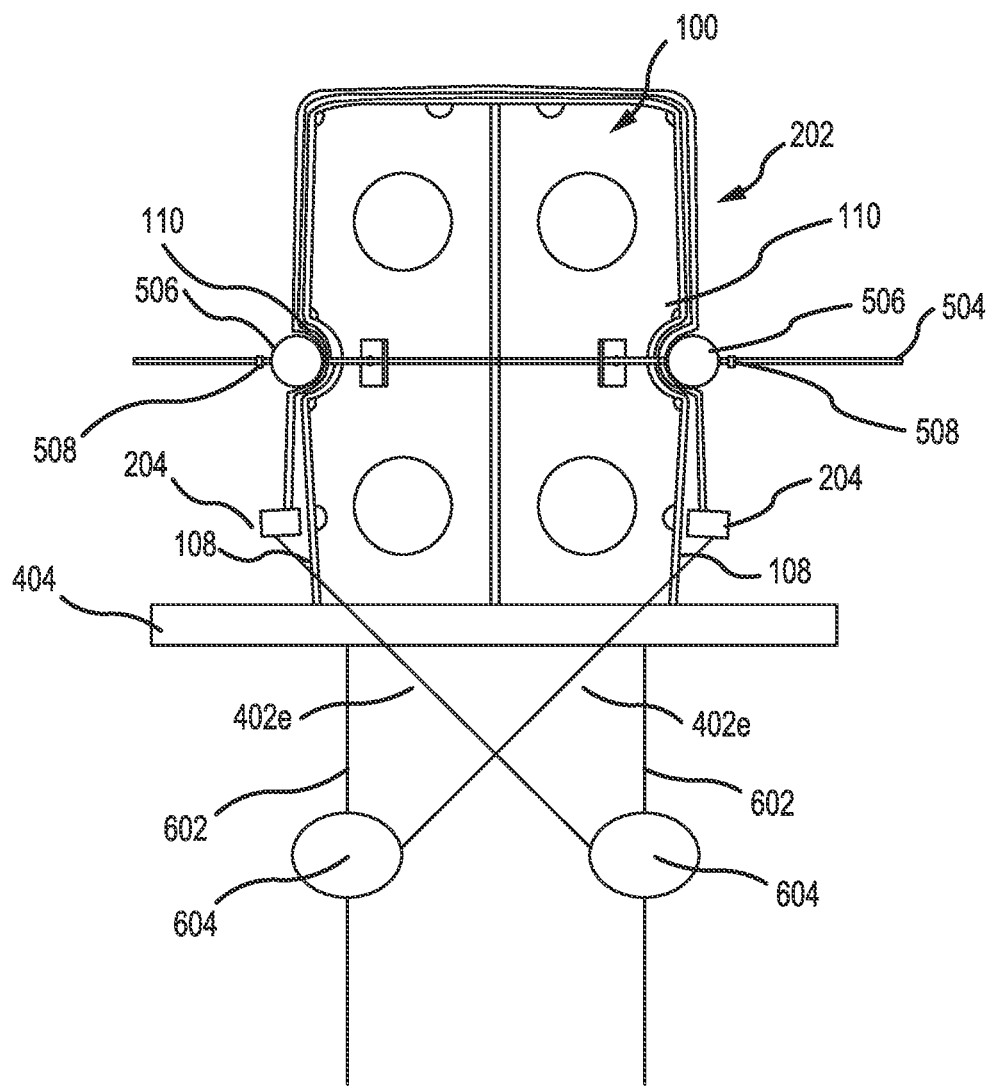
FIG. 6 illustrates an operation from a front view for completing the forming of the preform into a shaped body, in accordance with various embodiments.

Turning to FIG. 6, in accordance with various embodiments, an operation from a front view for completing the forming of the preform into a shaped body is illustrated. In various embodiments, as the forming rods 506 are slowly being forced into the forming beads 110 by tightening the nuts 508 onto the threaded rods 504 running between the forming rods 506 thereby pulling the preform board 202 into the forming beads 110, other strapping mechanisms 402e may be employed, with a first end coupled to the metal loop 310 of the clamping assemblies 204 of FIG. 3 and a second a second end coupled to respective attachment points 604 on a support structure 602 on an underside of table 404. In various embodiments, the attachment points 604 are on a side of the table 404 opposite the lower side sections 108, where the first end coupled to the metal loop 310 of the clamping assemblies 204 of FIG. 3 is located. In various embodiments, the strapping mechanisms 402e are simultaneously or substantially simultaneously tensioned so as to incrementally draw in the preform board 202 to the lower side sections 108 of the IML 100 to influence smooth forming around the radial corners of the IML 100. It is noted that as strapping mechanisms 402e are simultaneously or substantially simultaneously tensioned, strapping mechanisms 402d are released as the tensioning of the preform board 202 has now been assumed by the strapping mechanisms 402e. The undercut on the lower side sections 108 of the IML 100 provides a mechanical advantage for the final forming operation of the preform board 202. In various embodiments, after the forming rods 506 and the strapping mechanisms 402e have been fully tensioned, the strapping mechanisms 402e may be released and the preform board 202 held in place by the forming rods 506 to the IML 100 transitioned to a next tooling assembly.

Figure 7:
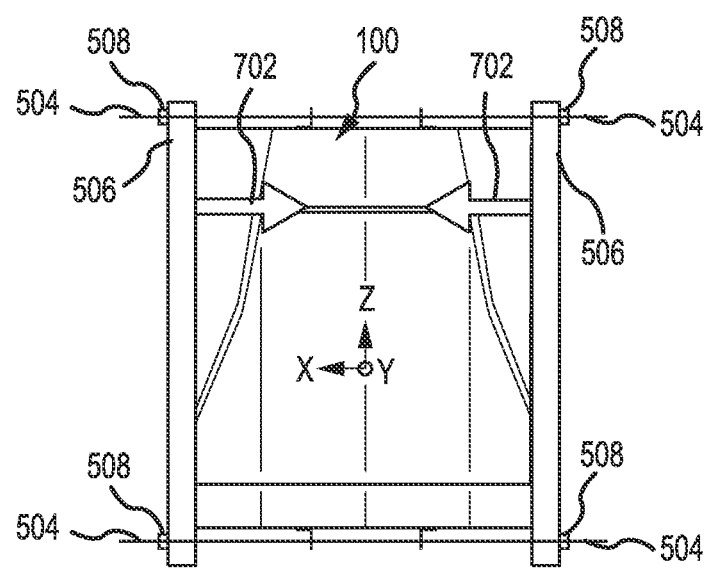
FIG. 7 illustrates an operation from a top view for completing the forming of the preform into a shaped body, in accordance with various embodiments.

Turning to FIG. 7, in accordance with various embodiments, an operation from a top view for completing the forming of the preform into a shaped body is illustrated. In various embodiments, the forming rods 506 are slowly being forced into the forming beads 110 by tightening the nuts 508 onto the threaded rods 504 running between the forming rods 506 thereby pulling the preform board 202 into the forming beads 110. In various embodiments, as the forming rods 506 are slowly being forced into the forming beads 110 by tightening the nuts 508 onto the threaded rods 504 running between the forming rods 506 thereby pulling the preform board 202 into the forming beads 110, the direction of translation 702 is along the x-axis into the center of the IML 100.

Figure 8:
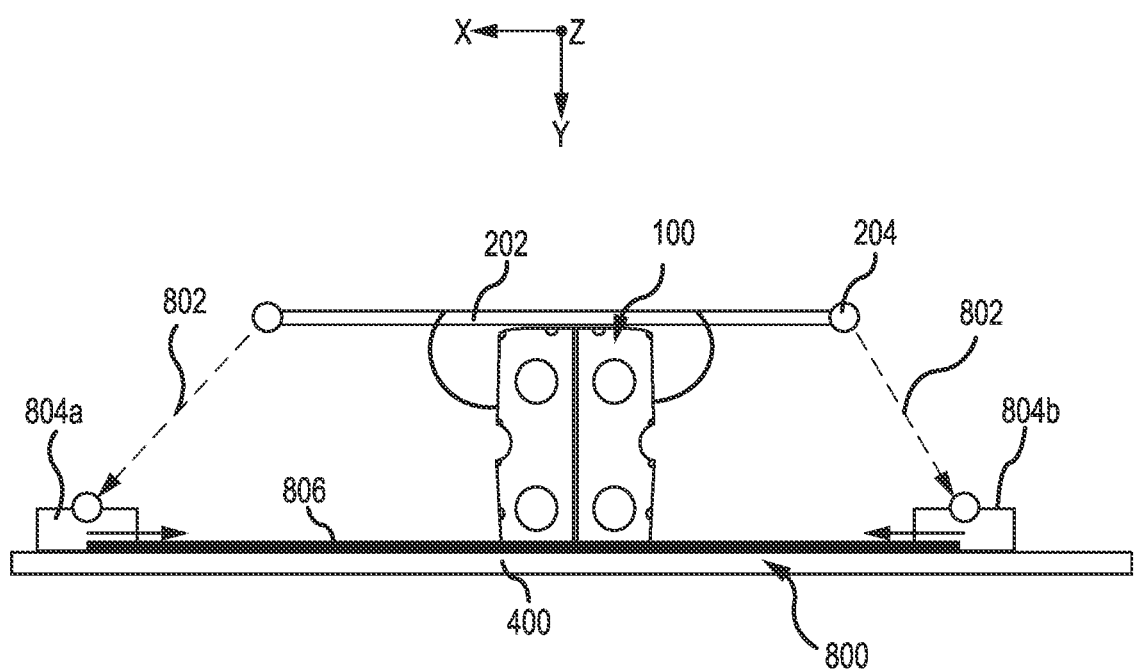
FIG. 8 illustrates a drawing operation for forming a preform into a shaped body, in accordance with various embodiments.

Turning to FIG. 8, in accordance with various embodiments, a drawing operation for forming a preform into a shaped body is illustrated. In various embodiments, rather than using plurality of strapping mechanisms 402a-d as shown in FIG. 4, strapping mechanisms 802 is coupled to the metal loop 310 of the clamping assemblies 204 of FIG. 3. In various embodiments, a second end of the strapping mechanisms 802 are coupled to respective carriage railing blocks 804a and 804b of a carriage rail system 800 on table 404. In various embodiments, carriage railing blocks 804a and 804b are coupled to a railing system 806 on table 404 such that, as strapping mechanisms 802 are simultaneously or substantially simultaneously tensioned so as to incrementally draw in the preform board 202 to influence smooth forming around the radial corners of the IML 100, the carriage railing blocks 804a and 804b translate along the railing system 806 toward the IML 100. In that regard, carriage railing block 804a translates along the railing system 806 along an x-axis in a positive direction and carriage railing block 804b translates along the railing system 806 along an x-axis in a negative direction. In various embodiments, once the carriage railing blocks 804a and 804b have reached the IML 100, another strapping mechanism may be employed, such as strapping mechanisms 402e of FIG. 6. It is noted that as strapping mechanisms 402e of FIG. 6, are simultaneously or substantially simultaneously tensioned, strapping mechanisms 802 are released as the tensioning of the preform board 202 has now been assumed by the strapping mechanisms 402e.

Figure 9:
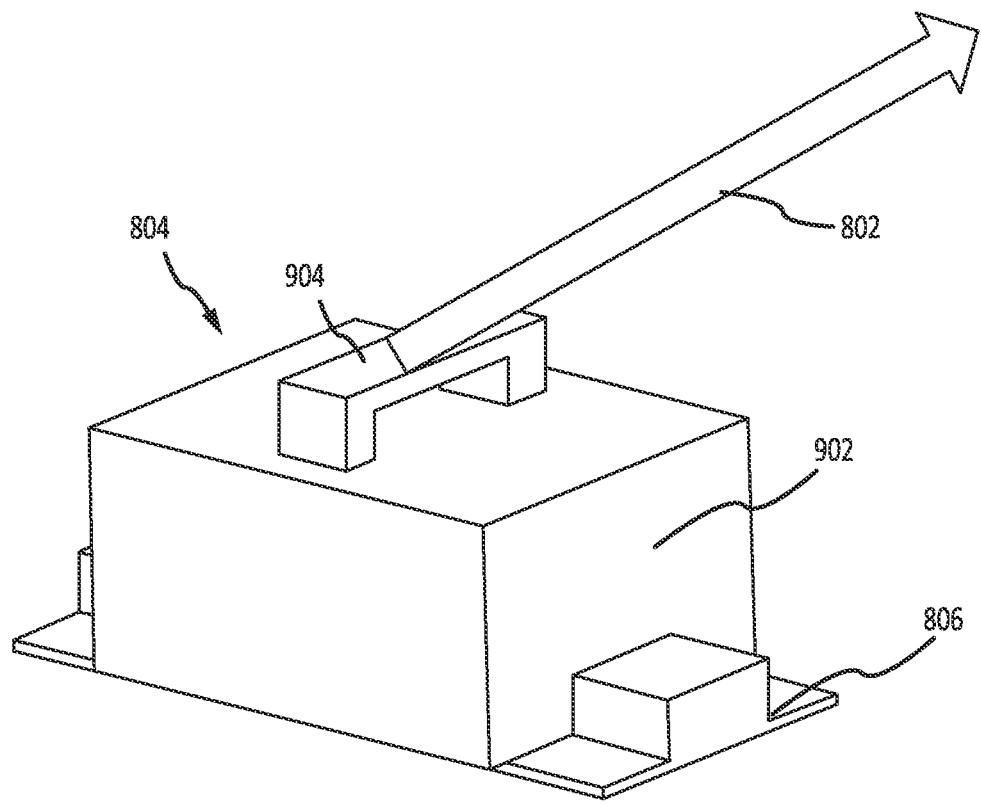
FIG. 9 illustrates a carriage railing block used in forming a preform into a shaped body, in accordance with various embodiments.

Turning to FIG. 9, in accordance with various embodiments, a carriage railing block used in forming a preform into a shaped body is illustrated. Carriage railing block 804, which may be either carriage railing block 804a or 804b of FIG. 8 comprises a base portion 902 and a strapping mechanism attachment portion 904. In various embodiments, the base portion is coupled to a railing system 806 such that the carriage railing block 804 translates along the railing system 806 along an x-axis in either a positive or a negative. In various embodiments, strapping mechanism attachment portion 904 is coupled to the base portion 902 and forms an opening such that a strapping mechanism, such as strapping mechanisms 802 of FIG. 8, may be coupled to the strapping mechanism attachment portion 904.

Figure 10:
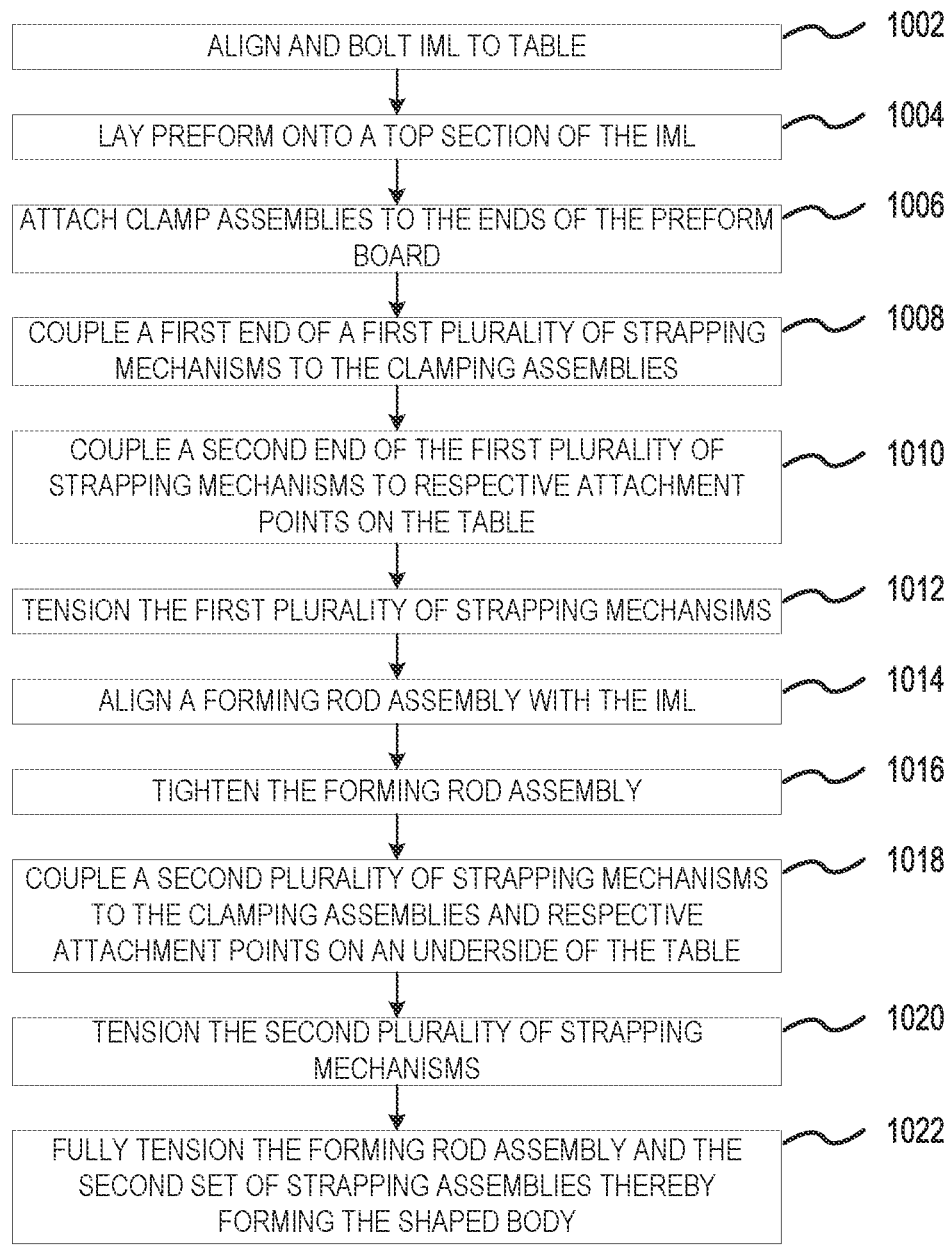
FIG. 10 illustrates a method for forming a preform into a shaped body, in accordance with various embodiments.

Referring now to FIG. 10, in accordance with various embodiments, a method for forming a preform into a shaped body is illustrated. For ease of description, the method 1000 is described with reference to FIGS. 1 thru 9. In step 1002, an IML, such as IML 100 of FIG. 1 is aligned and bolted onto a table, such as table 404 of FIG. 4. At block 1004, a preform board, such as preform board 202 of FIG. 2, is laid onto a top section of the IML. At block 1006, multiple clamp assemblies, such as clamping assemblies 204 of FIG. 2, are attached to the ends of the preform board. At block 1008, a first end of a first plurality of strapping mechanisms, such as strapping mechanisms 402a-d of FIG. 4, are coupled to the clamping assemblies. At block 1010, a second end of each of the first plurality of strapping mechanisms are coupled to respective attachment points on the table. At block 1012, various ones of the first plurality of strapping mechanisms are simultaneously or substantially simultaneously tensioned so as to incrementally draw in the preform board to influence smooth forming around the radial corners of the IML. At block 1014, a forming rod assembly, such as forming rod assembly 500 of FIG. 5, may be aligned with the IML. At block 1016, the forming rod assembly is tightened to slowly force or pull the preform board all the way to the tool body and into the forming beads, such as forming beads 110 of FIG. 1. At block 1018, a first end of a second plurality of strapping mechanisms, such as strapping mechanisms 402e of FIG. 6, are coupled to the clamping assemblies and a second end of each of the second plurality of strapping mechanisms are coupled to respective attachment points on and underside of the table. At block 1020, the second set of strapping mechanisms are simultaneously or substantially simultaneously tensioned so as to incrementally draw in the preform board to the lower sides of the IML to influence smooth forming around the radial corners of the IML. At block 1022, the forming rod assembly and the second set of strapping mechanisms are fully tensioned thereby forming the shaped body.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for forming a preform into a shaped body, the system comprising:
   an inner mold line;
   a plurality of clamping assemblies configured to incrementally tension the preform around a surface of the inner mold line;
   and a forming rod assembly to draw the preform into a set of forming beads of the inner mold line, wherein to draw the preform into the set of forming beads of the inner mold line, the forming rod assembly is configured to be coupled to the inner mold line and the forming rod assembly is configured to be tightened into the set of forming beads while holding a tension via the plurality of clamping assemblies, wherein the forming rod assembly comprises:
   a first set of alignment brackets coupled to a front one of a plurality of inner mold line stiffeners of the inner mold line;
   a second set of alignment brackets coupled to a back one of the plurality of inner mold line stiffeners;
   a first threaded rod positioned through the first set of alignment brackets;
   a second threaded rod positioned through the second set of alignment brackets;
   a first forming rod coupled to a first end of the first threaded rod and a first end of the second threaded rod;
   a second forming rod coupled to a second end of the first threaded rod and a second end of the second threaded rod;
   a first nut coupled to the first end of the first threaded rod;
   a second nut coupled to the second end of the first threaded rod;
   a third nut coupled to the first end of the second threaded rod;
   and a fourth nut coupled to the second end of the second threaded rod.

2. The system of claim 1, wherein each clamp assembly in the plurality of clamping assemblies includes a male member comprising a protrusion and a female member comprising a receptacle, and wherein the male member and the female member, when coupled together, apply a clamping force to an end of the preform.

3. The system of claim 2, wherein each clamp assembly in the plurality of clamping assemblies comprise one or more metal loops that couples to a first plurality of strapping mechanisms.

4. The system of claim 3, wherein a first set of the first plurality of strapping mechanisms are coupled to the plurality of clamping assemblies and to a first side of a table at a first location and wherein the system further comprises:
   a second set of the first plurality of strapping mechanisms coupled to the plurality of clamping assemblies and to the first side of the table at a second location to incrementally tension the preform around the surface of the inner mold line using the plurality of clamping assemblies in response to the first set of the first plurality of strapping mechanisms reaching a maximum tension, wherein the tension of the first set of the first plurality of strapping mechanisms is released once a second tension is provided by the second set of the first plurality of strapping mechanisms.

5. The system of claim 4, further comprising:
   further sets of the first plurality of strapping mechanisms to incrementally tension the preform around the surface of the inner mold line until the preform follows a near net shape of the inner mold line.

6. The system of claim 5, further comprising:
   a second plurality of strapping mechanisms coupled to the plurality of clamping assemblies and to a second side of the table to apply further tension and incrementally draw in the preform to lower sides of the inner mold line.

7. The system of claim 1, further comprising:
   a first set of a first plurality of strapping mechanisms coupled to the plurality of clamping assemblies and to a carriage rail system to incrementally tension the preform while the carriage rail system translates toward the inner mold line until the preform follows a near net shape of the inner mold line.

8. The system of claim 7, further comprising:
   a second plurality of strapping mechanisms coupled to the plurality of clamping assemblies and to a second side of a table to apply further tension and incrementally draw in the preform to lower sides of the inner mold line.

* * * * *